May 27, 1924.
H. R. AIKEN
ARTIFICIAL BAIT
Filed April 21, 1923
1,495,832
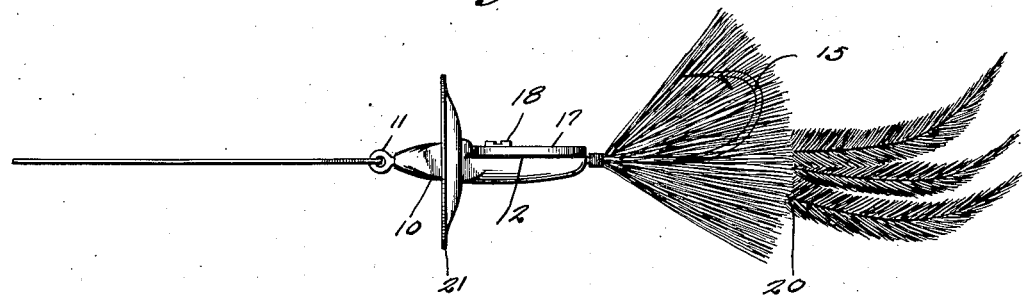
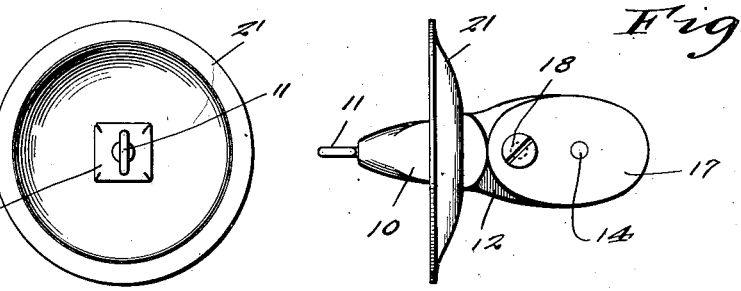
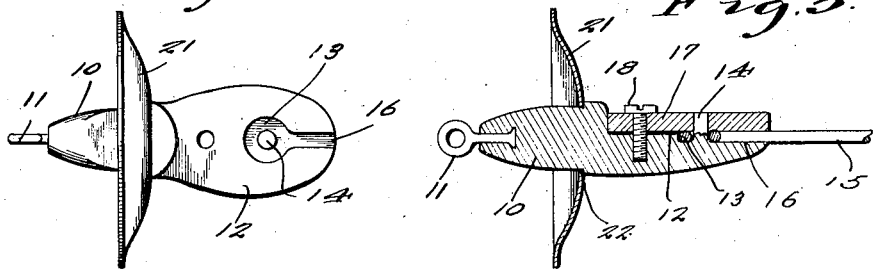
H. R. Aiken INVENTOR Patented May 27, 1924.

1,495,832

UNITED STATES PATENT OFFICE.

HAZEL R. AIKEN, OF HICKORY, NORTH CAROLINA.

ARTIFICIAL BAIT.

Application filed April 21, 1923. Serial No. 633,700.

*To all whom it may concern:*

Be it known that I, HAZEL R. AIKEN, a citizen of the United States, residing at Hickory, in the county of Catawba and State of North Carolina, have invented new and useful Improvements in Artificial Baits, of which the following is a specification.

The object of this invention is to provide a lure which shall include a head, a hook connected therewith, particular means for concealing the hook, and a disk carried by the head for relieving the water pressure on the fibrous structure of the hook concealing means, when the line is reeled in immediately after casting.

A further object is to provide particular means for connecting the hook with the head.

A still further object is to provide an artificial bait in which the hook is concealed by hackle feathers, and is maintained in attractive condition while being retrieved.

With the foregoing and other objects in view, the invention consists in the novel construction and arrangement of elements described and claimed, it being understood that modifications may be made within the scope of the claims without departing from the spirit of the invention.

In the drawings, Figure 1 shows the device in elevation; Figure 2 shows the disk member and a portion of the head; Figure 3 is an elevation of the head and disk; Figure 4 is a similar view, with the hook retaining plate removed; Figure 5 is a longitudinal section through the head.

The head 10 is formed of metal or other suitable material, and is provided with an eye member 11 for connecting the bait with a line.

The head has a flat side 12 provided with a recess 13 having a central pin 14 fixed therein and adapted to slip through the eye of the hook 15. The shank of the hook rests in groove 16, and a plate 17 has an aperture for receiving the end of the pin, and a second aperture for receiving a screw 18 passing into the neck, and retaining the hook in the position shown.

The hook is concealed or partly concealed by feathers 20, hackle feathers being especially suitable for the purpose and in order to prevent the water pressure from destroying the appearance of the feathers during the operation of reeling in the line, I provide a disk 21 having a central aperture 22. This disk fits over the head and is secured by soldering or otherwise and may be concaved on one side and convexed on the other side.

The lure is designed for casting with a short rod, and retrieved immediately after casting. The free and light movement of hackle feathers when relieved of water pressure is one of the important advantages realized, and the disk or water deflecting device formed, as shown, also results in producing ripples and a fluttering of the tail portion of the lure. Moreover, the hook is partly shielded in such manner that it will not readily catch in obstructions in the water, thus removing one of the known sources of annoyance.

What is claimed is:—

1. A device of the class described, comprising a head, a hook secured thereto, means for partly concealing the hook, and means carried by the head for relieving water pressure on the hook concealing means when the device is being retrieved.

2. A device of the class described, comprising a head, a hook secured thereto, means for partly concealing the hook, and a disk carried by the head and positioned perpendicularly with reference to the longitudinal axis of the head.

3. A device of the class described, comprising a head, a hook connected therewith, a feather-like structure partly concealing the head, and a disk carried by the head.

4. A device of the class described, comprising a head, a hook connected therewith, a hackle feather structure partly concealing the head, and a disk carried by the head.

In testimony whereof I affix my signature.

HAZEL R. AIKEN.